United States Patent
Gustafsson

(10) Patent No.: US 10,429,864 B2
(45) Date of Patent: Oct. 1, 2019

(54) METHOD FOR ADJUSTING A CLIMATE SYSTEM

(71) Applicant: QSEC AB, Askim (SE)

(72) Inventor: Per Gustafsson, Gothenburg (SE)

(73) Assignee: QSEC AB, Askim (SE)

( * ) Notice: Subject to any disclaimer, the term of this patent is extended or adjusted under 35 U.S.C. 154(b) by 38 days.

(21) Appl. No.: 15/974,966

(22) Filed: May 9, 2018

(65) Prior Publication Data

US 2018/0335791 A1  Nov. 22, 2018

(30) Foreign Application Priority Data

May 19, 2017 (EP) .................................. 17172026

(51) Int. Cl.
| | |
|---|---|
| *G05D 23/19* | (2006.01) |
| *G05D 7/06* | (2006.01) |
| *G05B 17/02* | (2006.01) |
| *F24D 19/10* | (2006.01) |

(52) U.S. Cl.
CPC ..... *G05D 23/1932* (2013.01); *F24D 19/1018* (2013.01); *F24D 19/1039* (2013.01); *G05B 17/02* (2013.01); *G05D 7/0641* (2013.01); *G05B 2219/2614* (2013.01)

(58) Field of Classification Search
None
See application file for complete search history.

(56) References Cited

U.S. PATENT DOCUMENTS

2010/0049480 A1* 2/2010 Pekar .................. F24D 19/1015
                                                                 703/2
2016/0291608 A1* 10/2016 Reider .................. G05B 15/02

FOREIGN PATENT DOCUMENTS

EP        0125239 B1    9/1987

OTHER PUBLICATIONS

Extended European Search Report from priority European Patent Application No. 17172026.1 dated Dec. 22, 2017 (7 pages).

* cited by examiner

*Primary Examiner* — Sean Shechtman
(74) *Attorney, Agent, or Firm* — Harness, Dickey & Pierce, P.L.C.; Anthony G. Fussner

(57) ABSTRACT

A computer implemented method for post installation adjustment of a climate system including determining a desired change of at least one radiator flow, determining a change of at least one Cv-value required to achieve the desired flow change, using a software implemented model of the system to automatically calculate a set of radiator flow changes resulting from the change of at least one Cv-value, identifying a subset of radiator flow changes from the set of radiator flow changes which have a perceivable impact on system performance, and repeating the above steps until the subset is empty.

The iteration allows an operator to determine a complete set of Cv adjustments that will provide the desired radiator flow change(s) while (as far as possible) leaving other radiator flows unchanged.

9 Claims, 6 Drawing Sheets

METHOD FOR ADJUSTING A CLIMATE SYSTEM

CROSS-REFERENCE TO RELATED APPLICATION

This application claim the benefit of and priority to European Patent Application No. EP17172026.1 filed May 19, 2017. The entire dislcosure of the above application is incorporated herein by reference.

FIELD OF THE INVENTION

The present invention relates to methods for adjusting climate systems, in particular heating systems in large buildings.

BACKGROUND OF THE INVENTION

In a climate control system for heating or cooling a large building, a single circulation pump can be arranged to circulate a heat carrying fluid, such as water, steam or oil, to a large number of loads such as radiators. The circulation pump may be connected to a boiler or to a heat exchanger of a primary heating system. The flow in the system is typically controlled by balancing valves, each one controlling the flow to a branch of radiators. In addition to these valves, there may be master control valves, controlling the flow to a group of balancing valves. For example, in a multi building system there may be one master control valve for each building, and a set of balancing valves on the ground floor of each building, each balancing valve connected to a set of apartments.

The balancing valves and master control valves distribute the flow from the circulation pump to each radiator, where a manual valve or thermostat reduces this maximum flow to a required flow.

Under these circumstances, it is a well-known challenge to adjust all control points of the system to provide the desired fluid flow and heating/cooling power in all parts of the system. Typically, even is such an adjustment is successfully completed for a building, it will not be maintained for very long, as there is a risk that someone will be tempted to make a manual adjustment at some point for some reason.

Also, and even more importantly, a sub-optimal flow control may lead to a decreased system efficiency, potentially requiring an increase in system temperature (i.e. temperature of the medium distributed by the circulation pump).

In order to mitigate this problem, and provide a more optimal flow control, some providers of heating systems provide a solution fixed flow regulators are installed throughout the system. These fixed flow regulators are used instead of the balancing valves and master control valves, and may be installed in connection with the thermostat of each radiator. Each such fixed flow regulator has a defined valve coefficient ($C_V$), representing a relationship between flow and pressure. More specifically, a $C_V$ of 1.0 indicates that the flow regulator will provide a flow of 1 cubic meter per hour at a differential pressure of 1 bar. Document EP 125 239 discloses an example of such a system.

The present applicant, QSEC Sverige AB in Askim, Sweden offer heating system control based on such fixed flow regulators. In order to determine the appropriate flow in each control point, and thus the appropriate fixed flow regulator, QSEC have developed a software which creates a mathematical model of the entire heating system, including e.g. all pipes and radiators. The model is based on available schematics of the system, together with detailed characteristics of each component indicated in the schematics.

Based on the computer model, the system is configured to determine a maximum flow in each radiator given a set circulation pump pressure. The system further determines pressure drops throughout the system required to achieve these flows, and thus appropriate valve coefficients (Cv). By installing fixed flow regulators having these Cv-values, a more optimal (and more permanent) adjustment of the system can be achieved, and as a consequence the required system temperature can be minimized thereby saving cost.

However, despite all efforts, the system may still deviate from the intended performance. One reason is that in some cases the mathematical model is unable to perfectly model the actual heating system behavior. To begin with, the properties of the actual system may deviate from those indicated in the schematics, e.g. because one or several components have been replaced. Further, the system may be subject to external influence with time, such as repeated painting of a radiator (leading to reduced heat transmission) or an indentation of a pipe (leading to a reduced flow—and increased pressure drop—in this pipe). Other processes that may influence the system performance is rust (potentially leading to a smaller inner diameter of a pipe) and compression of isolation in a wall (leading to reduced isolation of a pipe in that wall).

As consequence, the resulting temperature may be unsatisfactory in one or several rooms or apartments. When this happens, a manual adjustment is sometimes performed (typically during winter), e.g. increasing the Cv-value in a room which is too cold by simply replacing the fixed flow regulator. However, such adjustments will typically lead to an additional error or series of errors in other parts of the system, and it will be difficult (and very time consuming) to achieve an adjustment according to what was originally intended.

GENERAL DISCLOSURE OF THE INVENTION

It is an object of the present invention to mitigate the above mentioned problems, and provide an improved method for adjusting a heating system with fixed control elements.

This and other objects are achieved by a computer implemented method for post installation adjustment of a climate system including a circulation pump providing a pumping pressure, a plurality of radiators, a system of pipes connecting the pump with the radiators, and a plurality of fixed valve coefficient (Cv) flow regulators, the method comprising the steps:

a) providing a software implemented model of the heating system, said model defining a relationship between a set of Cv-values for said flow regulators and a set of radiator flows for a given pumping pressure, b) determining a desired change of at least one radiator flow, c) determining a change of at least one Cv-value required to achieve the desired flow change, d) using said software implemented model to automatically calculate a set of radiator flow changes resulting from said change of at least one Cv-value, e) identifying a subset of radiator flow changes from said set of radiator flow changes which have a perceivable impact on system performance, f) repeating steps b)-e) until said subset is empty.

According to this approach, the software implemented model is used during adjustment to anticipate the dynamic changes of radiator flows that will result from a change in one or several Cv-values. By determining which of those radiator flow changes that are significant enough to cause perceivable impact on system performance, consecutive iterations with additional adjustments of appropriate Cv-values can be made until no significant flow changes are identified.

This iterative simulation allows the operator to determine a complete set of Cv adjustments that will provide the desired radiator flow change(s) while (as far as possible) leaving other radiator flows unchanged.

By determining the complete set of Cv adjustments before beginning the actual replacement of flow regulators, costly and time consuming iterations in real life may be avoided.

The identification of radiator flow changes having perceivable impact can be a simple benchmark, where each radiator flow change is compared to a threshold. However, more elaborate methods can also be contemplated.

The initial determination of desired radiator flow change(s) can be accomplished by determining a set of temperatures by measuring room temperatures in a plurality of rooms heated by the heating system, determining a representative temperature of the set of temperatures, identifying rooms having a room temperature deviating from the representative temperature by a predefined amount, and for each identified room, measuring a radiator flow of a radiator in said room and a determining desired change of the measured radiator flow.

Tests show that using the median temperature as representative temperature provides an efficient and effective flow regulator adjustment.

The step of measuring a radiator flow of a radiator may include measuring the temperature difference ($\Delta T$) across the radiator and then determining the corresponding flow using known characteristics of the radiator. This is a simple and effective way to determine the radiator flow. The temperature difference may be measured e.g. using a heat camera to measure incoming water temperature and return water temperature.

Of course, other ways to determine the radiator flow are possible, including pitot-tube, ultrasound, and inductive measurements.

A further aspect of the invention relates to software code for performing the adjustment according to the first aspect, and such software stored on a transitory or non-transitory medium.

BRIEF DESCRIPTION OF THE DRAWINGS

The present invention will be described in more detail with reference to the appended drawings, showing currently preferred embodiments of the invention.

DETAILED DESCRIPTION OF PREFERRED EMBODIMENTS

Figure 1:
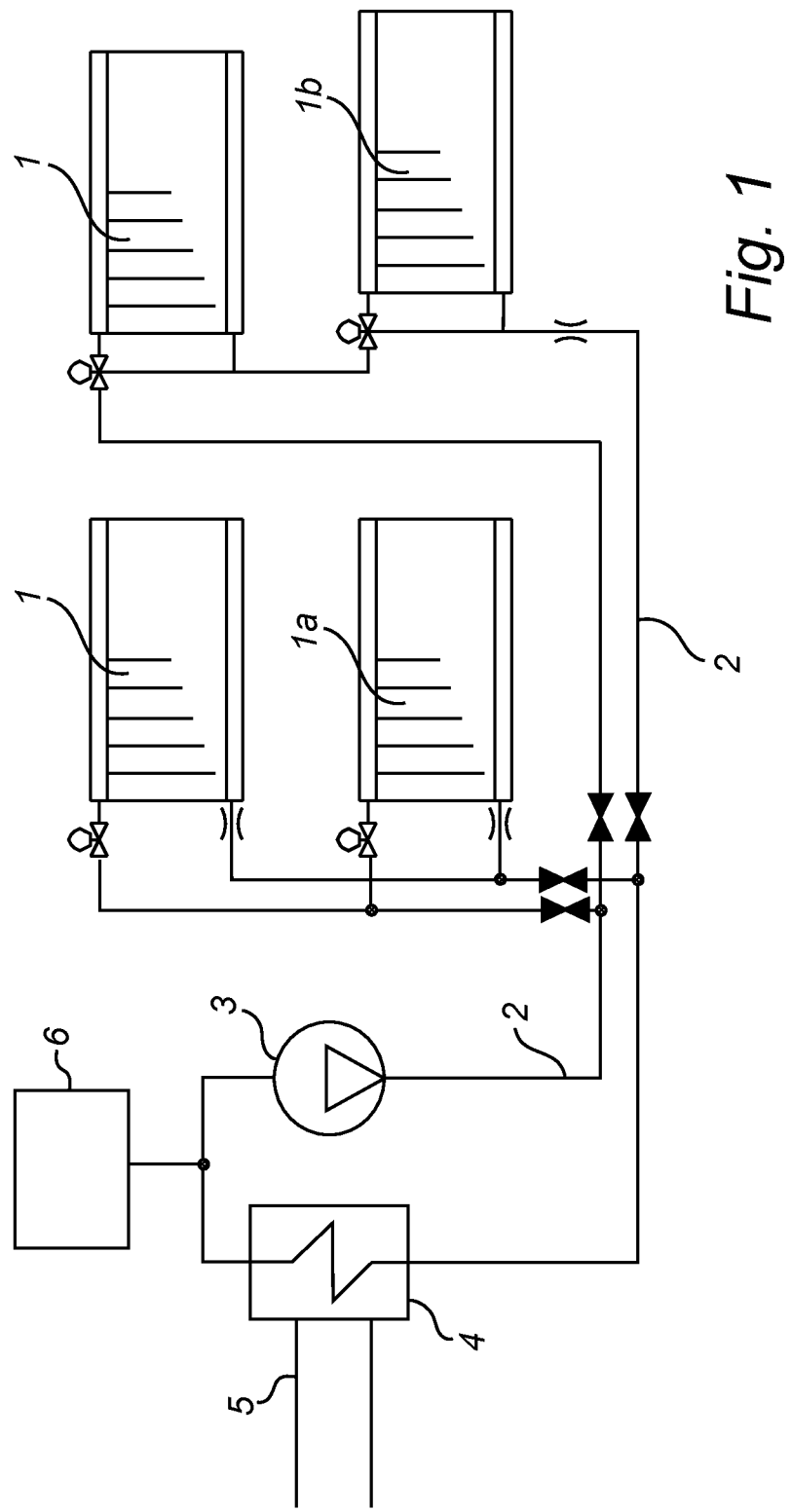
FIG. 1 schematically illustrates the main parts of a heating system.

With reference to FIG. 1, a circulation based heating system generally comprises a plurality of radiators 1, pipes 2 connecting the radiators, and a circulation pump 3, for circulating a heat carrying medium through the pipes 2 and radiators 1. The medium is typically, but not necessarily, water. Other possible mediums include oil and steam. The radiators 1 may be of different types, and FIG. 1 illustrates radiators 1*a* connected by twin pipes, and radiators 1*b* connected by single pipes. Another type of radiator system, not illustrated here, is a Tichelmann system.

The system further comprises a heat source, here illustrated as a heat exchanger 4 having a primary side 5 connected to an external heating supply, e.g. district heating. Alternatively, the heat source is a central boiler, powered e.g. by coal or oil. Finally, the system illustrated in FIG. 1 includes an expansion tank 6, configured to absorb sudden pressure variations in the system.

It is noted that the illustrated embodiment relates to a heating system. However, the present invention is not restricted to heating systems, and the radiators may equally well be arranged to provide cooling. In order to increase the efficiency of such cooling radiators, fans may be arranged to increase the flow of air around them.

Figure 2A:
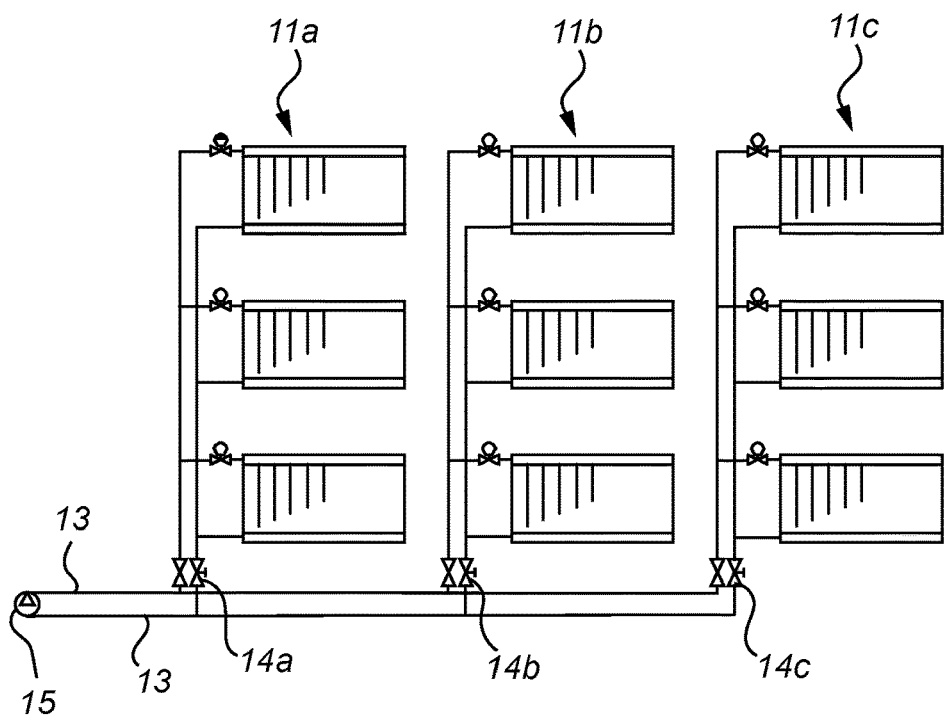
FIGS. 2*a* and 2*b* schematically illustrates a heating system with a plurality of radiators connected in branches.

With reference to FIG. 2*a*, the principles of conventional pressure drop adjustment in a large heating system are illustrated. The heating system here comprises a plurality (here three) branches 11*a*, 11*b*, 11*c* of radiators 12, each branch connected to a master pipe 13 by means of a balancing valve 14*a*, 14*b*, 14*c*. Each branch may typically include radiators located on different stories of a building. Each radiator has a manual control valve or thermostat control valve for local adjustment of the heating power.

It is noted that the system may also include one or several master control valves connected to a set of branches, e.g. all branches of the same building. Such master control valves may then allow disconnecting an entire building from the heating system, e.g. in the event of maintenance. Such master control valves are not illustrated in FIG. 2*a*-2*b*.

When adjusting the system in FIG. 2*a*, the pressure drop caused by the master pipe 13 from the circulating pump 15 to the first, second and third branch is calculated. Each balancing valve 14*a*-*c* is then adjusted to provide a pressure to the radiators in the respective branch that will result in a desired flow through the radiator. The radiators are treated as standard components, and the pressure in each branch should thus be the same. As an example, the balancing valves are set to provide a branch pressure of 10 kPa.

If the resulting pressure at each radiator was identical, the flow and heating power would be the same at each (identical) radiator. In reality, however, there will be a difference in pressure between the radiators, caused e.g. by difference in level above ground, pipe sections between the radiators, etc. Therefore, a typical effect of this type of traditional adjustment is that the radiator at an upper floor (with lower pressure) provides less heating power than a radiator at a lower floor (with higher pressure). Attempts to improve (increase) the output power of a radiator in an upper floor will often result in an increased branch pressure in that branch, or an increased temperature of the circulating fluid. Such attempts risk lowering the overall efficiency of the system.

Figure 2B:
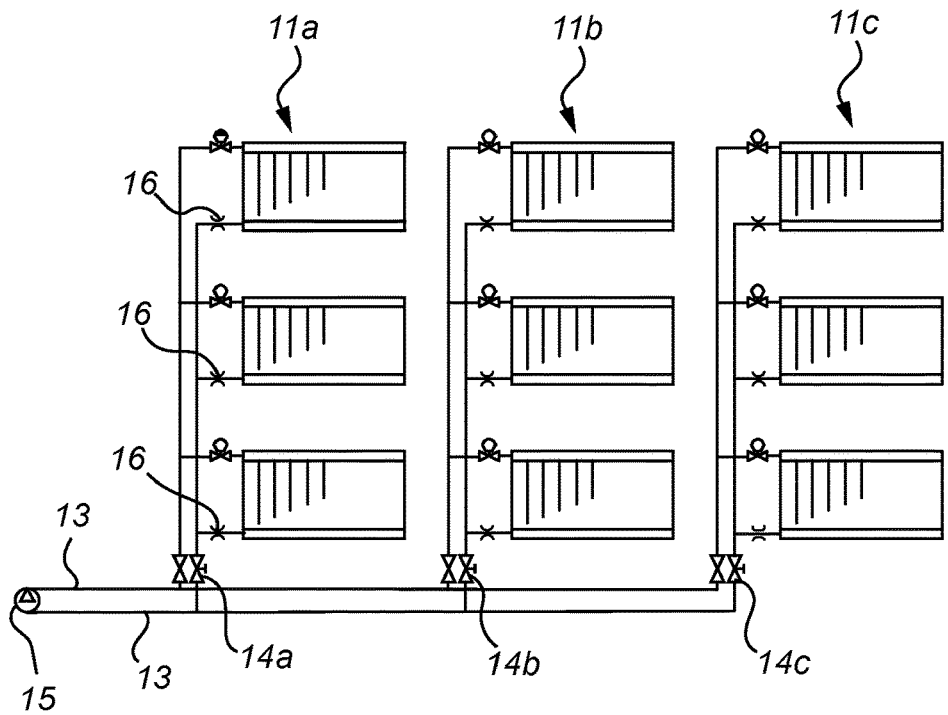
Figure 3:
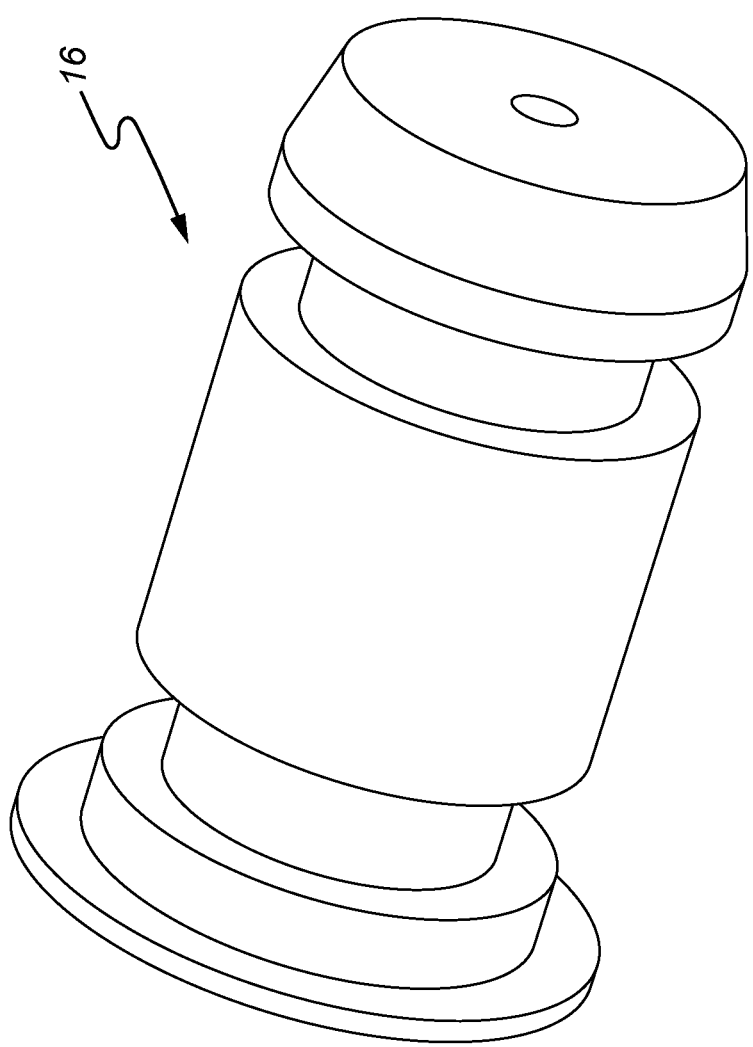
FIG. 3 is a perspective drawing of a control element with fixed valve coefficient (Cv).

With reference to FIG. 2*b*, the principles of a more elaborate adjustment, based on fixed valve coefficient control elements, is illustrated. Here, all balancing valves 14*a*-*c* are left completely open. Instead, each radiator is provided with an individually selected flow regulator 16 with a fixed valve coefficient (Cv-value). It is noted that each radiator in a branch typically will be subject to an individual pressure, and therefore have a flow regulator with an individual Cv-value so that the flow through each radiator of the same type will be essentially equal. The radiators in FIG. 2b are connected in parallel, and in this case the flow regulators are arranged immediately downstream each radiator, i.e. on the outlet of the radiator. If the radiators are connected in series, it may be sufficient with one flow regulator for each series of radiators. An example of a flow regulator 16 with fixed valve coefficient is illustrated in FIG. 3. In this particular example, the Cv-value is 0.06.

Figure 4:
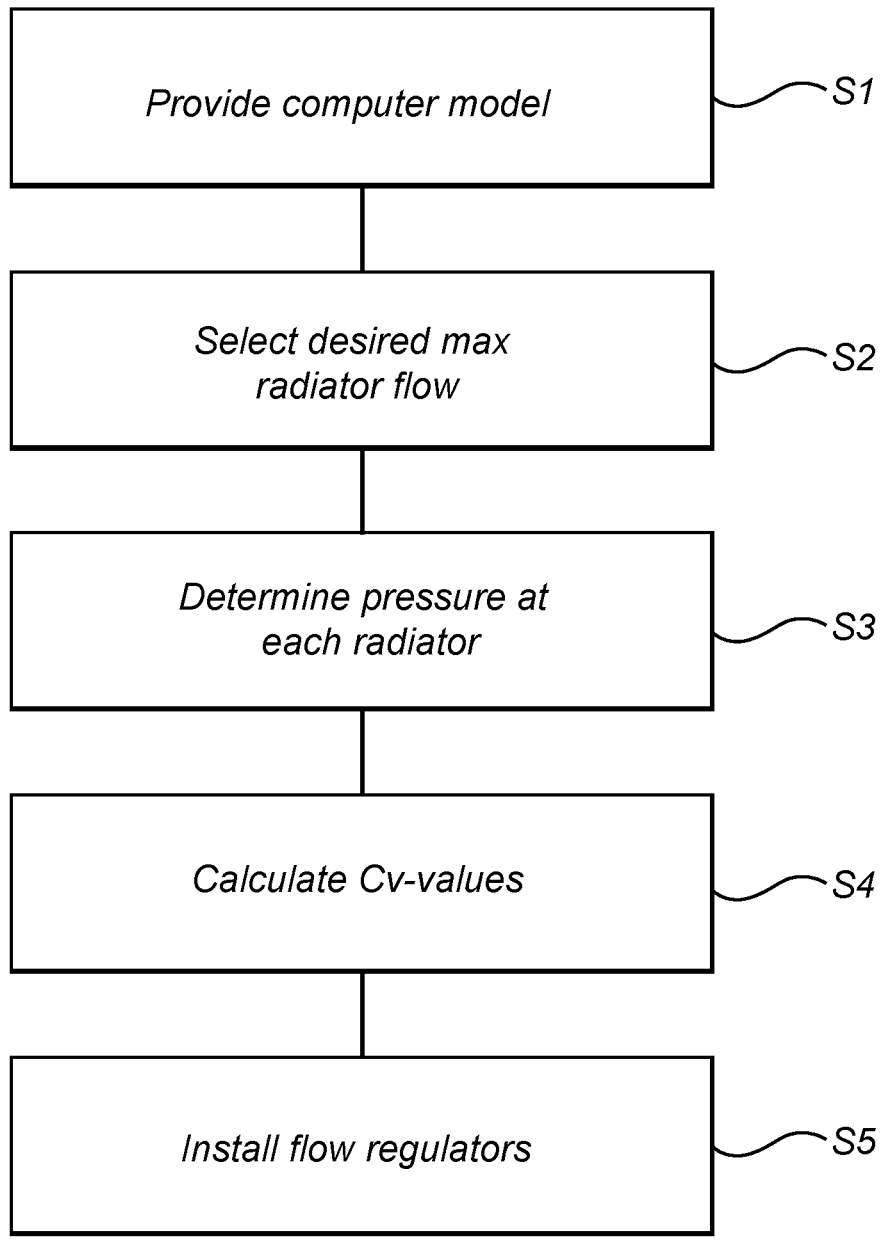
FIGS. 4, 5 and 6 are flow charts of embodiments of the present invention.

A method for determining the Cv-value of each flow regulator is illustrated in FIG. 4.

First, in step S1, the entire system (pipes, junctions, radiators, etc.) is modelled in a computer implemented mathematical model. The model is based on a schematics of the heating system, and specific characteristics of various components are found in look-up tables. When completed, the model provides a mathematical relationship between a set of Cv-values for the flow regulators and a set of resulting radiator flows for a given pumping pressure.

In step S2, a desired (maximum) radiator flow which should be available at each radiator is chosen. This flow is essentially determined by the type of radiator and the required maximum heating power of that radiator. Based on the chosen set of radiator flows and the input pressure from the circulation pump, the model is used to determine a pressure at each radiator (step S3), and then (step S4) a required valve coefficient can be calculated for each radiator based on the calculated available pressure and chosen radiator flow. When the appropriate valve coefficients have been calculated, flow regulators corresponding to these Cv-values are installed in each radiator (Step S5), thereby ensuring the chosen (maximum) radiator flows in each radiator. The method in steps S1-S5 can be performed with a dedicated software, e.g. HCCS from QSEC Sweden AB.

Figure 5:
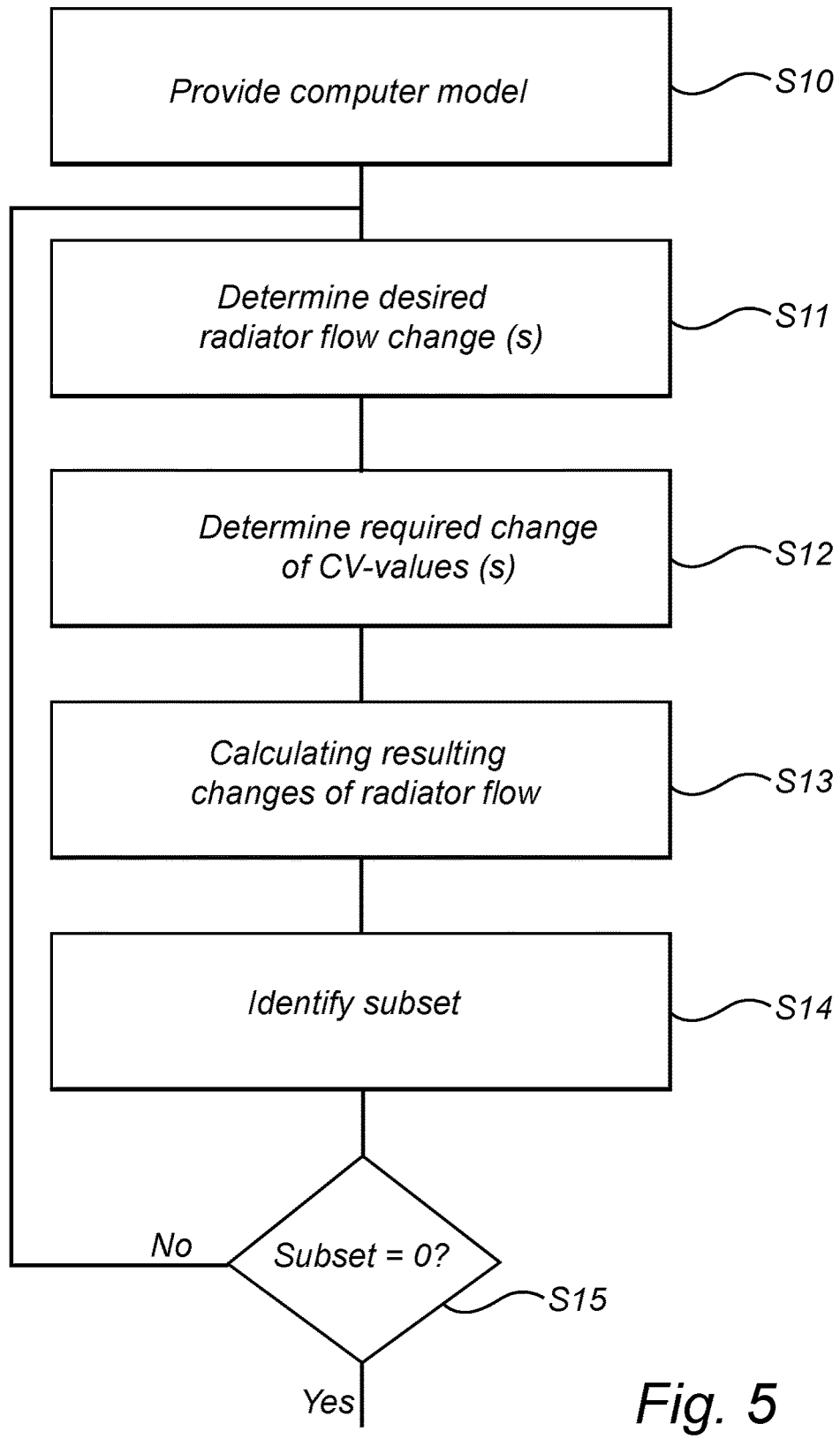

Turning now to FIG. 5, a method for post installation adjustment of a climate system according to an embodiment of the present invention will be discussed. The method is intended to be performed in a system including a circulation pump providing a pumping pressure, a plurality of radiators, a system of pipes connecting the pump with the radiators, and a plurality of fixed valve coefficient (Cv) flow regulators. The system may have been installed using a method as discussed above with reference to FIG. 2b and FIG. 4, but other ways to establish such a system are also possible.

In step S10, a software implemented model of the heating system is provided, which model defines a relationship between a set of Cv-values for the flow regulators and a set of resulting radiator flows for a given pumping pressure. If the system has been adjusted according to a method as illustrated in FIG. 4, then step S10 corresponds to step S1.

Figure 6:
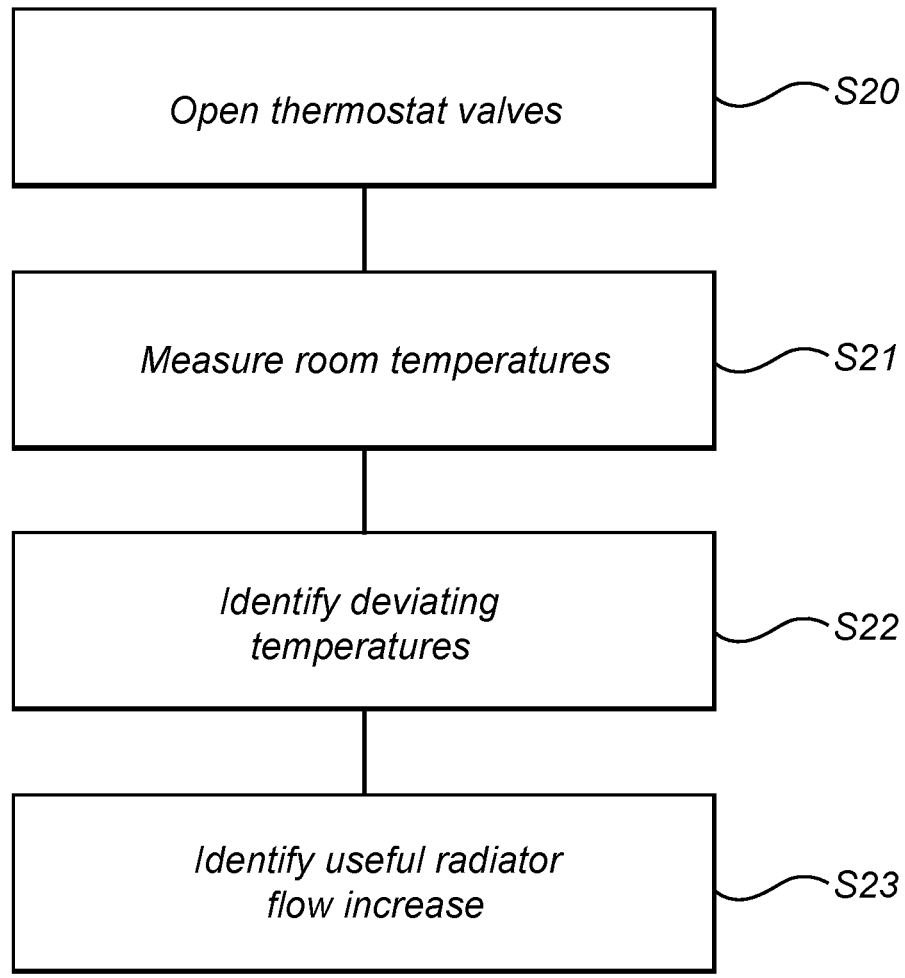

Then, in step S11, a desired change of at least one radiator flow is determined. This step may be performed in various ways, including a very rudimentary determination that the heating power in a specific room is considered to be insufficient. In a more elaborate embodiment, step S11 is performed using a method shown in FIG. 6.

First, in step S20, the thermostat valves of each radiator are fully opened, and the temperature in each room is allowed to stabilize. Then, in step S21, all stabilized room temperatures are measured, and a suitable representative temperature is selected. As an example, this may be the median temperature of all room temperatures. In step S22, radiators corresponding to room temperatures deviating more than a given threshold from the representative temperature are identified. In step S23, the identified radiators are assessed, to determine if the flow through these radiators should be changed, i.e. decreased (if the temperature is too high) or increased (if the temperature is too low). For those radiators where a changed flow is considered useful in order to reduce the deviation from representative temperature, such changes represent the desired radiator flow changes in step S11 in FIG. 5.

It is noted that in some cases, a radiator will be operating at or close to its maximum power. If a room temperature corresponding to such a radiator is too low, then it is not possible to increase the temperature by increasing the radiator flow. In these cases, a replacement of the radiator should be considered, in order to avoid an increase of the overall system temperature.

The assessment in step S23 may involve a measurement of the flow through the radiator, in order to compare with the optimal or desired flow according to the model. One way to perform such a measurement is to use a heat camera and measure the fluid temperature at the input and output of the radiator and thus the temperature difference ($\Delta T$) across the radiator. The corresponding radiator flow can then be determined based on known characteristics of the radiator. Other ways are also possible.

Returning to FIG. 5, in step S12 a change of at least one Cv-value required to achieve the desired flow change(s) is determined. It is noted that the calculation in step S12 is only a start approximation, where dynamic effects of a changed Cv-value are not taken into consideration.

Then, in step S13, the computer model is used to automatically calculate a set of radiator flow changes resulting from the change of at least one Cv-value made in step S12. It is important to note that a change of a Cv-value of one radiator may affect the pressure (and thus the flow) also in other radiators in the same branch, and potentially even in other branches. The changes determined in step S12 will therefore inevitably result in a series of pressure and flow changes throughout the system, and the model will allow calculation of these changes.

In step S14, the resulting radiator flow changes are reviewed, in order to identify a subset of the resulting radiator flow changes which have a perceivable impact on system performance. The subset should thus include all flow changes which are significant enough to cause noticeable effects for people living in the building. One simple way to accomplish step S14 is to compare all radiator flow changes with a predefined threshold. In any event, the effect of step S14 is to disregard very minor radiator flow changes, which are small enough to be unnoticed or at least may be compensated by the thermostat valves.

The steps S11-S14 are then conditionally repeated in step S15 until the subset of perceivable radiator flow changes is empty. It is noted that during these iterations, the "desired change" in step S11 will be changes required to compensate the subset of radiator flow changes identified in step S14.

When the subset is empty, all calculated Cv-value changes are implemented in the system by installing suitable flow regulators. Thereby, the initially desired radiator flow changes (e.g. as determined in step S23) have been achieved while (as far as possible) keeping other radiator flows unchanged.

It is noted that while the calculation of Cv-values in step S3-S4 in FIG. 4 is an analytical calculation, based on a theoretical model, the iterative calculation in FIG. 5 is a numerical approximation based on the actual system performance. It is therefore quite likely that an exact correspondence cannot be achieved, but with the inventive method any deviations from the desired radiator flows can be held to a minimum.

The person skilled in the art realizes that the present invention by no means is limited to the preferred embodiments described above. On the contrary, many modifications and variations are possible within the scope of the appended claims. For example, although the above embodiments have been described in relation to a heating system, the invention is also applicable in a cooling system.

The invention claimed is:

1. A computer implemented method for post installation adjustment of a climate system including a circulation pump providing a pumping pressure, a plurality of radiators, a system of pipes connecting the pump with the radiators, and a plurality of fixed valve coefficient (Cv) flow regulators, the method comprising the steps:
   a) providing a software implemented model of the climate system, said model defining a relationship between a set of Cv-values for said flow regulators and a set of radiator flows for a given pumping pressure,
   b) determining a desired change of at least one radiator flow,
   c) determining a change of at least one Cv-value required to achieve the desired flow change,
   d) using said software implemented model to automatically calculate a set of radiator flow changes resulting from said change of at least one Cv-value,
   e) identifying a subset of radiator flow changes from said set of radiator flow changes which have a perceivable impact on system performance,
   f) repeating steps b)-e) until said subset is empty,
   determining a complete set of CV value adjustments based on steps a)-f), and
   adjusting said flow regulators based on said complete set of CV-value adjustments.

2. The method according to claim 1, wherein a first iteration of step b) includes:
   determining a set of temperatures by measuring room temperatures in a plurality of rooms heated by the climate system,
   determining a representative temperature of said set of temperatures,
   identifying rooms having a room temperature deviating from said representative temperature by a predefined amount,
   for each identified room, measuring a radiator flow of a radiator in said room and a determining desired change of the measured radiator flow.

3. The method according to claim 2, wherein the step of measuring a radiator flow of a radiator includes measuring a temperature difference ($\Delta T$) across the radiator, and determining the corresponding radiator flow based on known characteristics of the radiator.

4. The method according to claim 3, wherein said temperature difference ($\Delta T$) is measured using a heat camera to measure incoming flow temperature and return flow temperature.

5. The method according to claim 2, wherein said representative temperature is one of a median temperature and an average temperature.

6. The method according to claim 1, wherein the step of identifying a subset of radiator flow changes which have a perceivable impact on system performance includes comparing each radiator flow change with a predefined threshold.

7. A method for balancing a climate system including a circulation pump providing a pumping pressure, a plurality of radiators, a system of pipes connecting the pump with the radiators, and a plurality of fixed valve coefficient (Cv) flow regulators, the method comprising:
   creating a computer implemented model of the climate system, said model including characteristics of each component in the climate system,
   setting a desired maximum radiator flow to be available at each radiator,
   using said model, said pump pressure and said maximum radiator flow to determine a pressure at each radiator,
   for each radiator, calculating a valve coefficient based on the desired maximum radiator flow and the determined pressure at this radiator,
   at each radiator, installing a flow regulator having a valve coefficient corresponding to the calculated valve coefficient for this radiator, and
   performing a post installation calibration according to claim 1.

8. A non-transitory computer readable medium storing thereon a computer program product including computer program code portions for performing the steps of the method of claim 1 when executed on a computer processor.

9. A climate system including a circulation pump providing a pumping pressure, a plurality of radiators, a system of pipes connecting the pump with the radiators, and a plurality of fixed valve coefficient (Cv) flow regulators, wherein said fixed valve coefficient (Cv) flow regulators have been determined using the method according to claim 1.

* * * * *